March 13, 1962  C. E. CLOUD  3,024,581
ENFOLDING SELF-CLINGING FILM
Filed Feb. 11, 1960  3 Sheets-Sheet 1
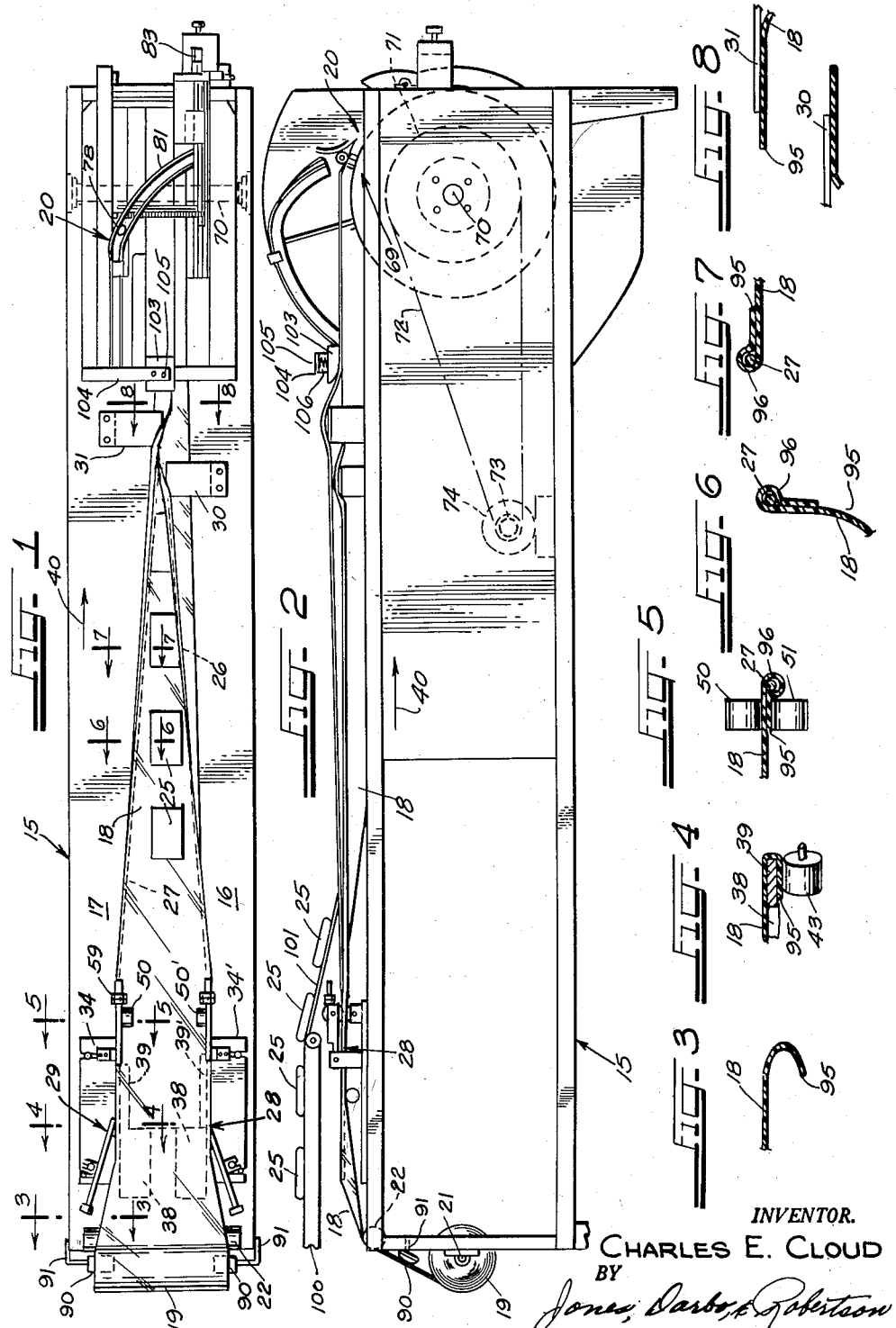
INVENTOR.
CHARLES E. CLOUD
BY
Jones, Darbo & Robertson
Att'ys.

March 13, 1962  C. E. CLOUD  3,024,581
ENFOLDING SELF-CLINGING FILM
Filed Feb. 11, 1960  3 Sheets-Sheet 2
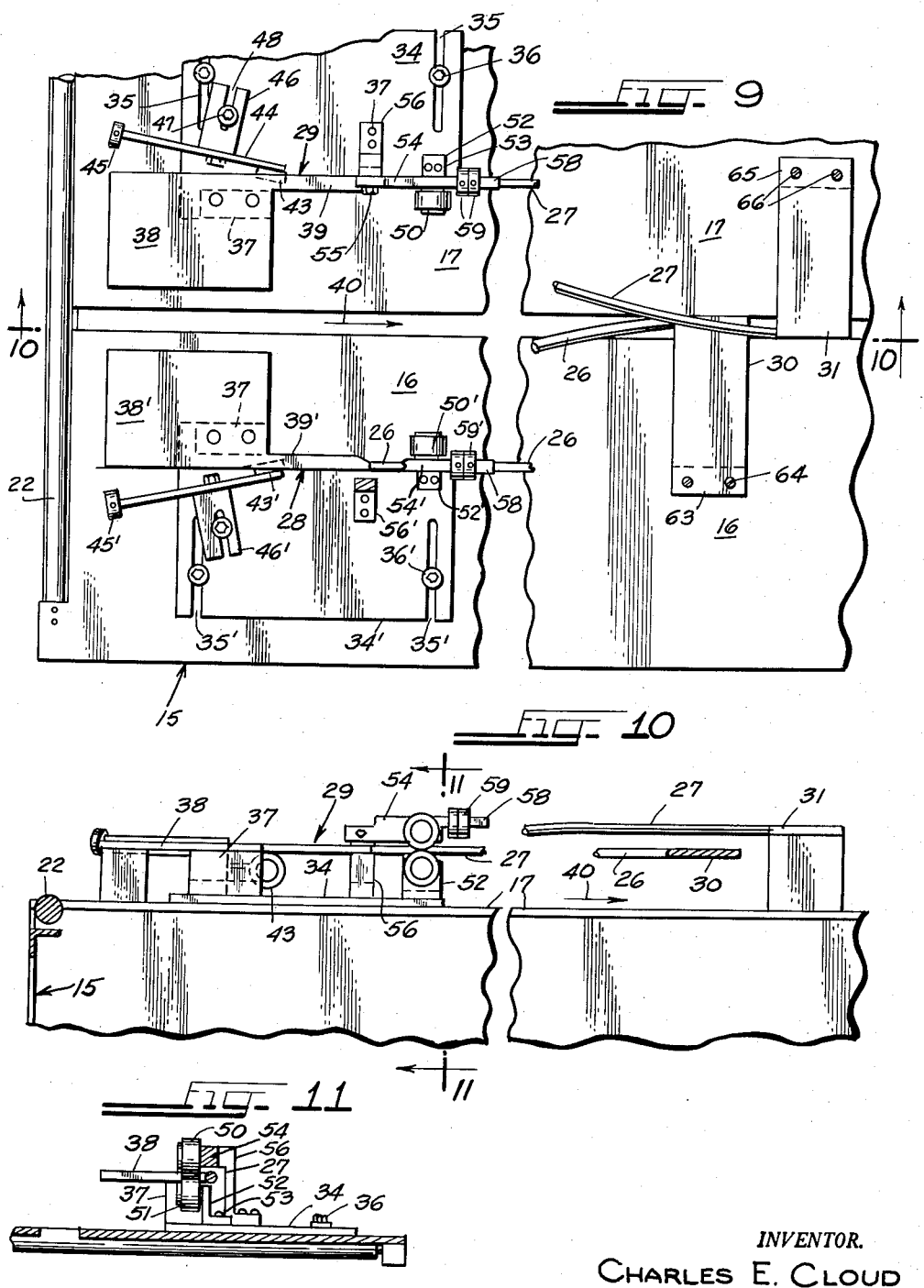
INVENTOR.
CHARLES E. CLOUD
BY
Jones, Darbo & Robertson
ATTYS.

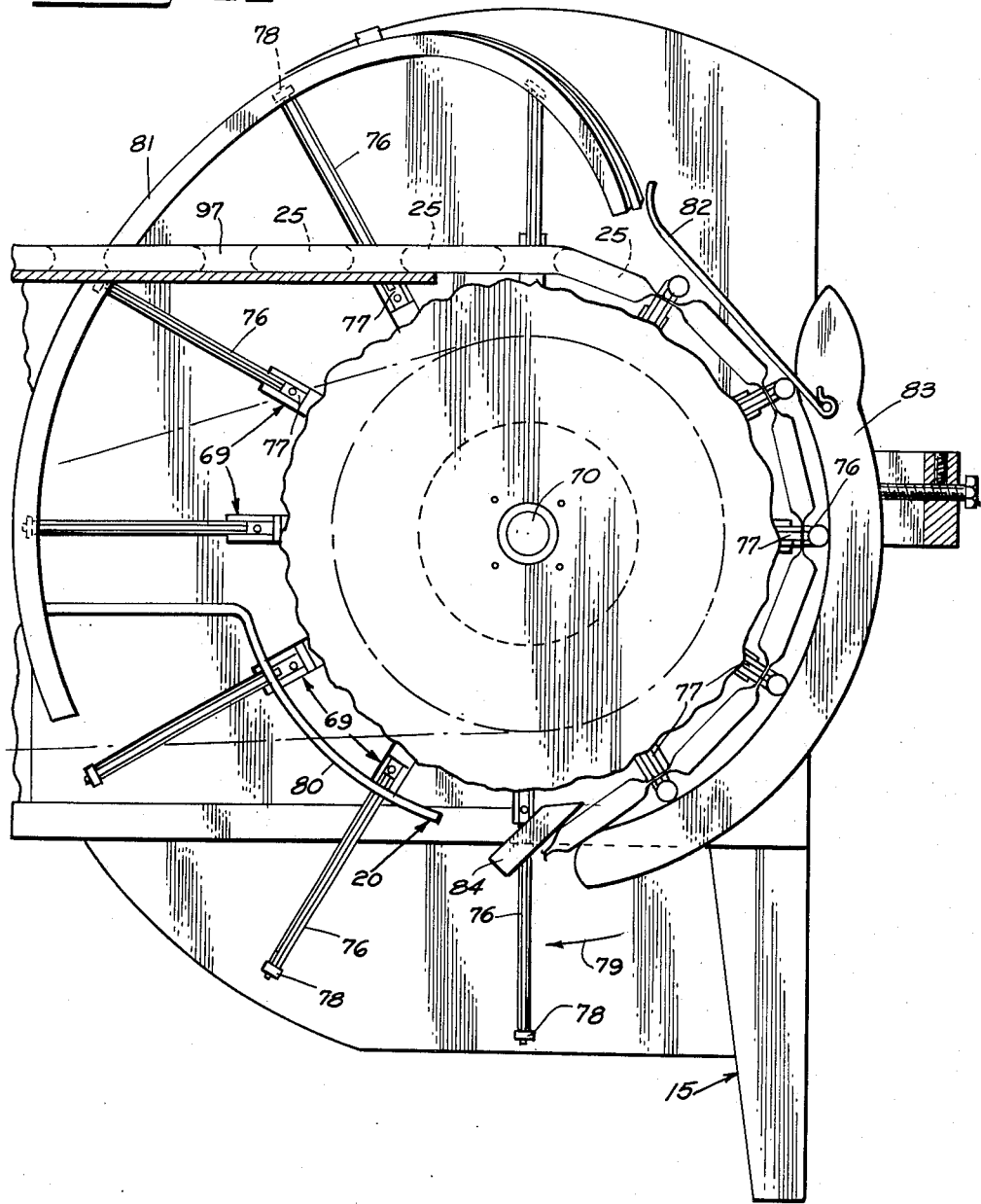

3,024,581
ENFOLDING SELF-CLINGING FILM
Charles E. Cloud, 150 Prairie Ave., Wilmette, Ill.
Filed Feb. 11, 1960, Ser. No. 8,180
15 Claims. (Cl. 53—28)

In the packaging of product in films of plastic or the like one of the commonly used methods of forming the package of product is to form a tube of the film. The product to be packaged is placed within the tube as separate objects of product with the tube thereafter being divided between the spaced objects to form a series of separate packages. One common procedure for forming the tube is to employ two sheets of film which are fixed to each other adjacent their edges. Another often used procedure is to use a single sheet of film which is drawn about and through rounded tubular molds which cause the film to assume the configuration of the molds. The side edges of the film are overlapped as the film moves through the molds and are fixed to each other to form a continuous tube having a cross sectional configuration corresponding to that of the molds. The latter procedure has the advantage over that of the former in that only one seam is required to form the tube instead of two and thus presents only half the possibility of seam failure as does a tube with two side seams.

One of the disadvantages of forming the tube about a mold of the desired shape is that the product is fed into the tube through the center of the mold which inherently requires that the product be at least slightly smaller than the size of the finished tube. Thus the ultimate finished package usually will not have the film drawn tightly and smoothly about the packaged object. This decreases the aesthetic appearance of the package as compared to one in which a film fits tightly and smoothly about the object that is packaged. Another disadvantage with the use of film forming molds is that in order to enable the film to move freely over the mold as the film is drawn into the desired shape the mold necessarily must be rounded. Any sharp corners will impair the movement of the film thereover and will cause difficulty. Thus the packaging of rectangular objects by this procedure is, at best, most difficult.

The foregoing procedures have the advantage that they enable the production of packages from a roll of film in a continuous manner on a production line basis. In the present invention this advantage has been retained while providing a novel and surprisingly simple method and apparatus for continuously wrapping the sides of a continuous length of film about objects to be packaged at spaced intervals therein. In accordance with this invention a tight, neat appearing, tube may be formed about objects of any size or shape. The fact that the objects have rectangular corners will not impair the ability of the method and apparatus to draw the film tightly about the sides of the object and to form a tube thereabout. The term "object" is used herein with respect to the product being packaged to refer to single units of product, groups of units, or even particulate material.

According to the present invention, a novel and surprisingly simple enfolding method and apparatus are provided for use with self-clinging film of the general clinging characteristics exhibited by a commercial plastic film sold under the trademark Saran. However the invention is not limited to the use of that particular film which is an electrostatically charged film formed of a modified vinylidene chloride co-polymer. Other plastic films may be used, as for example, a rubber hydrochloride film such as that sold under the trademark Pliofilm, polyethylene films, etc. Generally these latter films have not been given an electrostatic charge and thus do not exhibit the self-clinging characteristics. However, thin gauges of the film which might be employed in packaging in accordance with the present invention can be given an electrostatic charge so as to have the self-clinging characteristics.

In the method of my invention the film is moved lengthwise along a predetermined path. The actual forming of the tube takes place along a portion of that path. The object to be packaged can be deposited upon the film either as it moves along that portion of the path or prior to the time that it reaches that portion of the path. As the film enters the portion of the path through which the tube is to be formed, the sides of the film are curled to form a loop along each side of the film. In forming the loop the edges of the film are doubled back against a more central portion of the film and preferably pressed against that more central portion to affix the edges to the more central portion to form a closed loop at the sides of the film. In curling the sides of the film to form the loop, the curling movement should be in the reverse direction of rotation than will be the subsequent rotational movement of the film as it is drawn about the object to be packaged.

In the preferred method a film with self-clinging characteristics is employed to obtain this affixation but the same result could be obtained by utilizing a weak adhesive. The loops at each side of the film are employed to support the sides of the film and to draw the sides of the film up and over the objects to be packaged. This manipulation will be completed upon reaching the end of the portion of the path previously referred to at which time the loops will be opened and the two sides of the film which have been overlapped and brought into juxtaposition are, in the preferred embodiment, affixed to each other to complete the closing of the tube. In some apparatus, the method of my invention may be employed for manipulating only one edge of a film.

After the tube with the objects therein has been completed, the tube will be closed between each of a series of spaced objects within the tube to define a series of packaged objects. In accordance with the conventional practices this latter step usually will be a heat sealing process. If desired, the tube may be cut across the middle of the seal or between spaced seals to produce separate packages.

In the apparatus I have devised for carrying out this method the film is moved longitudinally along a supporting surface across a portion of which the tube is to be formed. The sides of the film are temporarily wrapped around separate guide rods with the edges at those sides being pressed against the central panel of the film. The self-clinging characteristics of the film cause those edges to cling to the central panel. Thus a continuous loop or hem is formed which will follow the guide. Each guide raises its associated edge while the central area slides along the supporting surface where the objects or "fills" are placed on it. Then the guides move the sides laterally inward in the wrapping direction.

At about the time that the two sides have been overlapped as in the ultimate tube, although spaced upwardly one from another, a stripper, along which each side of the film moves, separates the self-clinging edge of the film from the main body. The stripper opens out the edges of the film and releases the sides of the film from the guides. At the same time the sides are overlapped in position for the closing of the tube. The overlapped sides of the film will cling to each other to maintain the tube in its desired form. If desired a heat sealing unit can be passed along the overlapped sides of the tube to fuse them together. The tube then proceeds into a further apparatus for dividing the tube into units which is a part of this invention only to the extent that it is the means by which the length of film is drawn and by which the packaging is completed.

Additional objects and advantages of the invention will be apparent from the following descriptions of the drawings.

*Designation of Figures*

FIGURE 1 is a plan view of an embodiment of my invention;

FIGURE 2 is a side elevation of the embodiment of FIGURE 1 showing in addition a means for the objects to be packaged to be deposited onto the packaging machine per se;

FIGURE 3 is a partial section through the edge of the film as seen at line 3—3 of FIGURE 1;

FIGURE 4 is a partial section through the edge of the film and forming plate as seen at line 4—4 of FIGURE 1;

FIGURE 5 is a partial section through the edge of the film and guide rod as seen at line 5—5 of FIGURE 1;

FIGURE 6 is a partial section through the edge of the film and guide rod as seen at line 6—6 of FIGURE 1;

FIGURE 7 is a partial section through the edge of the film and guide rod as seen at line 7—7 of FIGURE 1;

FIGURE 8 is a partial section through the film and stripper as seen at line 8—8 of FIGURE 1;

FIGURE 9 is an enlarged partial plan view showing the structure at each end of the guide;

FIGURE 10 is a section taken at line 10—10 of FIGURE 9;

FIGURE 11 is a partial section taken at line 11—11 of FIGURE 10; and

FIGURE 12 is an enlarged elevational view of the tube dividing structure with portions of the side of the frame broken away.

*General Description*

The embodiment illustrated in the drawings comprises a frame generally 15 having a pair of top plates 16 and 17 which form a supporting surface across which the tube is formed. The tube is formed from a length of film 18 which is continuously unreeled from a roll 19 thereof. As best seen in FIGURES 1 and 2, film 18 moves along a predetermined path across the top of the supporting surface defined by plates 16 and 17. At the opposite end of the frame 15 from the roll of film 19 is a tube dividing means generally 20 one of the functions of which is to draw the film 18 along its path of movement during the course of which the tube is formed. The roll of film 19 is rotatably mounted on a suitable spindle 21 to permit the film to be easily unrolled. Rotatably mounted on frame 15 immediately above roll 19 is a roller 22 which permits the film 18 to move smoothly up and about the corner of the frame.

As the film 18 moves along a portion of its path of travel across the top of plates 16 and 17 the film is formed into a tube about the objects 25 which are to be packaged. In the illustrated embodiment this portion of the path is represented in a general way by the length of a pair of guides 26 and 27. As the film commences traversing this portion of the path the sides of the film are formed into closed loops about the guides 26 and 27 by loop forming units 28 and 29 respectively. At the end of that portion of the path the loops are opened by strippers 30 and 31. Guides 26 and 27 are supported only at their ends, one end of each guide being supported by the respective forming unit and the other end being supported by the respective stripper.

*Loop Forming Units*

Loop forming units 28 and 29 are identical except that one is left hand and the other is right hand. Only forming unit 29 will be described, it being apparent that the description thereof will apply equally to forming unit 28. To facilitate this understanding the same numbers are applied to forming unit 28 in the drawings as those employed in describing forming unit 29, except that the numbers applied to forming unit 28 have primes thereafter, e.g. 34′.

Forming unit 29 is supported by a mounting member 34 resting on and secured to top plate 17. Mounting member 34 has a pair of slots 35 therein which slots receive bolts 36 threaded into plate 17. Thus by loosening bolts 36 mounting member 29 may be moved toward or away from mounting member 28 to align the forming unit. After alignment, bolts 36 are tightened to fix the position of the forming unit. A block 37 secured to member 34 supports a forming plate 38. Plate 38 has a finger 39 extending therefrom in the direction of the path of travel of the film 18 as represented by arrow 40. The outstanding end of finger 39 tapers to the size of guide 27 and is affixed thereto. Similarly, the outstanding end of finger 39′ tapers into and supports guide 26.

A film curling wheel 43 is rotatably mounted adjacent one end of a lever 44. Releasably affixed to the other end of lever 44 is a counterweight 45. Lever 44 is pivotally secured to mounting block 46. In turn mounting block 46 is secured to mounting member 34 by a bolt 47. A bolt 47 threaded into member 34 extends through a slot 48 in block 46 to permit adjustment of the position of wheel 43.

Immediately inwardly from guide 27 are a pair of wheels 50 and 51. Wheel 51 is journaled on a stub shaft extending from an upper portion of angle 52. The base of angle 52 is secured to mounting member 34 by screws 53. Wheel 50 is journaled on a stub shaft affixed to lever 54 intermediate the ends of the lever. One end of the lever 54 is pivotally mounted on bolt 55 secured to angle bracket 56. The base of angle bracket 56 is secured to mounting member 34 by screws 57. The other end of lever 54 forms a finger 58 on which are releasably and shiftably secured a pair of counterweights 59.

*Strippers*

Strippers 30 and 31 are flat plates with the leading edge thereof rounded off. Stripper plate 30 is attached to a mounting block 63 by screws 64. Block 63 is secured to plate 16. Similarly stripper plate 31 is attached to a mounting block 65 by screws 66 with block 65 being secured to plate 17. Guide 26 extends to and is affixed to stripper plate 30 while guide 27 extends to and is affixed to stripper plate 31 in alignment with the outer edge thereof. Guides 26 and 27 are aligned to cross each other immediately adjacent the stripper plates. At that point guide 27 is at a slightly greater elevation than is guide 26 as illustrated in FIGURE 10.

*Tube Dividing Unit*

The tube dividing unit 20 may be one of a number of types of devices such as are presently being used in this field. The embodiment illustrated takes the form of a turret having a plurality of clamping assemblies generally 69 which are mounted to rotate with a shaft 70. Shaft 70 is affixed to a sprocket 71 which is driven by a chain 72 from a sprocket 73 on the output shaft of motor 74.

Clamping assemblies 69 include an outer clamp arm 76 and an inner clamp arm 77 which have mating jaws to engage opposite sides of the tube as hereinafter described. The jaws are electrically heated, or have electrically heated areas, so as to seal the opposite walls of the tube to each other as they are clamped together. A knife of a hot wire (not shown) is used in conjunction with the jaws to sever the tube intermediate the sealed area to separate the tube with the product therein into separate packages.

Outer arms 76 are pivotally mounted at one end in the clamping assembly and the other end of each outer arm rotatably carries a cam roller 78. As the clamping assemblies 69 rotate with shaft 70, the outer clamp arms are moved toward and away from the inner clamp arms by a series of cams. The direction of rotation is indicated by arrow 79 in FIGURE 12. When the outer clamp arm approaches about the 9 o'clock position, the arm is held in substantially a vertical plane by a face cam 80. This aligns the arms for entry of the rollers 78 into a closing cam 81. Between the 9 o'clock and the 12 o'clock position, closing cam 81 commences moving the rollers and outer arms 76 down toward the inner arms 77. Upon reaching the end of closing cam 81 the outer arms 76 usually will drop by gravity into juxtaposition with the inner arms 77 so as to clamp the tube therebetween. A hinged plate 82 insures that this movement takes place.

Continued movement of the clamping assemblies brings the rollers 78 under a pressure cam 83 which presses against the rollers. This applies a corresponding pressure between the outer clamp arm 76 and the inner clamp arm 77 so that the jaws thereof crimp the tube in the areas between the objects being packaged. It is during the course of travel of the clamping assemblies 69 along pressure cam 83 that the tube is sealed between the units of objects being packaged and is cut to form separate packages. The positive engagement of the clamping assemblies 69 with the tube which is obtained by the jaws of the two clamp arms 76 and 77 provides the driving force to draw the tube and thus the film 18 through the tube forming operation.

After passing pressure cam 83, the force of gravity usually will cause the outer clamp arm 76 to fall downwardly into a vertical position. To insure that they do so, an opening cam 84 is positioned in the circular path of movement of the roller 78. Should the outer arm 76 fail to open, cam 84 will contact roller 78 and open the arm. This opening permits the packages to fall away from the tube dividing means 20 onto a conveyor or chute (not shown).

Operation

In operation the film supplied on roll 19 may be one of a number of types as previously mentioned. In the usual instance it will be a film that naturally has self-clinging characteristics such as is the case with the film sold under the trademark Saran, which is strongly self-clinging due to both electrostatic and smooth surface molecular attraction. However, if the film lacks these characteristics, means may be provided to give the film a static electricity charge as the film is moved into the tube forming structure. Such a means, though not yet found necessary, is illustrated in FIGURES 1 and 2. It comprises a pair of woolen pads 90 secured to mounting arms 91. Woolen pads 90 brush the under face of the film along the edges thereof to give the sides an electrostatic charge (or an additional charge). Pads 90 also may represent means for applying a weak adhesive to the sides of the film adjacent the edges.

As the film moves away from roller 22 and commences its passage across the tops of supporting plates 16 and 17 the sides of the film are curled re-entrantly under the more central portion of the film. The initial curling of the film is illustrated in FIGURE 3.

The central portion of the film then passes over forming plates 38 and 38' with the side edges 95 of the film extending under forming plates 38 and 38'. The sides of the film now pass roller 43 which curls the sides of the film tightly about the forming plates 38 and 38'. Rollers 43 are angularly positioned with respect to the path of movement of the film so that the rolling action of the roller tends to draw the edges 95 of the film toward the center or opposite side of the film. The position of the film at this point is illustrated in FIGURE 4.

Thereafter the U shaped sides of the film move along fingers 39 and 39' in the direction illustrated by arrow 40. The continued movement in this direction slides the U shaped sides out onto guides 26 and 27. Immediately after being received on guides 26 and 27 the U shaped sides are pressed together by rollers 50 and 51. The amount of pressure that is applied can be adjusted by means of counterweights 59 and 59'. This presses the film immediately adjacent edge 95 against a more central portion of the film as illustrated in FIGURE 5 so as to form a closed loop 96 at each side of the film about guides 26 and 27.

At this stage the objects 25 to be packaged are moved onto a central portion of the film by a feeding means comprising a belt conveyor 100 and a gravity chute 101 illustrated in FIGURE 2. Other types of feeding means may be employed depending upon the particular installation, the objects to be packaged, etc. Preferably, the feeding means will be of a type which will provide the objects on the film with a predetermined spacing and perhaps with a predetermined positional relationship with respect to indicia or labeling on the film. In some instances the use of any feeding means will be dispensed with. In such cases the objects to be packaged may be placed by hand on the film. The exact point along the path of travel of the film 18 at which the objects are placed on the film is not critical. They should, however, be placed on the film at points spaced to fit the objects between clamps 69 and at a point prior to that at which the distance between guides 26 and 27 is smaller than the width of the objects 25.

As is best seen in FIGURE 1, guides 26 and 27 extend angularly toward each other between the loop forming units 28 and 29 and the strippers 30 and 31. At the same time the guides 26 and 27 should be spaced a sufficient distance above the top of supporting plates 16 and 17 so that the objects to be packaged will move freely thereunder.

As the film travels between the loop forming means and the strippers, the loops 96 slide along guides 26 and 27. I have found that if a cold rolled steel rod as furnished by the supplier is employed for guides 26 and 27 the loops 96 have no difficulty in sliding along the rods. The film tends to cling to a smooth polished rod.

During this movement of the film longitudinally along guides 26 and 27 loops 96 rotate about the guides. Referring to FIGURE 6, the double thickness of film at edge 95 and the loop 96 are rotating in a counter clockwise direction about guide 27. As the edges of the film approach the stripper plates 30 and 31 the sides of the film and the loop 96 assume substantially the position illustrated in FIGURE 7. At the trailing end of the stripper plates the sides of the film as well as the edges 95 pass below the level of the stripper plate. This is illustrated in FIGURE 8.

As the film moves between the FIGURE 7 and the FIGURE 8 positions the loops 96 are gradually opened with the edges 95 being peeled away from the more central portion of the film 18 and turned down into the generally horizontal position illustrated in FIGURE 8. This of course, occurs first with respect to the side of the film that was looped about guide 26. Thereafter the side of the film that was looped about guide 27 is similarly uncurled and laid over the preceding side of the film to form the tube 97. The two sides of the film across the top of the objects being packaged are pressed together by a shoe 103 loosely supported from bracket 104 by pins 105 and resiliently urged against the overlapped sides of the film by springs 106 about pins 105. Electric heating elements are provided in shoe 103 so that the overlapped sides of the film can be heat sealed across the tops of the objects being packaged should that be desired. In many instances it will not be necessary inasmuch as the self-clinging characteristics of the film and the seals across the tube between the objects will be sufficient to hold the film about the object.

The position of guides 26 and 27 primarily will be determined by the size and shape of the objects being packaged. The guides normally will have some flexibility which will provide some give to accommodate some variation in size of objects. The guides will be positioned so that the sides of the film are drawn tautly and smoothly about and over the objects being packaged. Since the sides of the film will be engaged on the guides by loops 96 it will be apparent that the film can be guided so as to form a neat, smooth package.

After the tube 97 of film 18 has been formed with the objects 25 spaced therein, as best illustrated in FIGURE 12, the tube proceeds into the tube dividing means 20. At that station the outer clamp arms 76 are moved down across the tube in the spaces between the objects with the jaws of the arms 76 and 77 clamping those portions of the tube together. A heat seal is made across the clamped portions with the tube being cut intermediate the seal so as to create separate packages. In some embodiments the heat sealing may be dispensed with and the self-clinging characteristics of the film relied upon to hold the film together at the ends of the packages after those ends have been brought together by the jaws.

Although the foregoing disclosure offered for public dissemination is detailed to insure adequacy and aid understanding, this is not intended to prejudice that purpose of a patent which is to cover each new inventive concept therein, no matter how others may later disguise it by variations in form or additions or further improvements. The following claims are intended as the chief aim toward this purpose, as it is these that meet the requirement of pointing out the parts, improvements, or combinations in which the inventive concepts are found.

The principle of this invention can also be used, perhaps less simply, by wrapping the film around a movable guide means.

I claim:

1. The method of forming a tube from a length of film comprising the steps of: continuously moving the film lengthwise in a given direction along a predetermined path; continuously curling the sides of the film in one direction of rotation as the sides traverse a first point along said path to form a loop at each side with the edge doubled back adjacent a more central portion of the film; affixing the film adjacent the edges to said portion of the film to define closed loops at each side thereof; supporting said edges by said closed loops as said film moves from said first point to a second point in said direction from said first point; moving said closed loops toward each other in the opposite direction of rotation as said film travels toward said second point; and opening said closed loops adjacent said second point and bringing the sides of the film together to form a tube.

2. The method of forming a tube from a length of film comprising the steps of: continuously moving the film lengthwise in a given direction along a predetermined path; continuously curling the sides of the film as the sides traverse a first point along said path to form a loop at each side with the edge doubled back adjacent a more central portion of the film; affixing the film adjacent the edges to said portion of the film to define closed loops at each side thereof; supporting said edges by said closed loops as said film moves from said first point to a second point in said direction from said first point; moving said closed loops toward each other as said film travels toward said second point; and opening said closed loops adjacent said second point and bringing the sides of the film together to form a tube.

3. The method of manipulating a side edge of a length of film as the film moves lengthwise along a given portion of a path, said method comprising the steps of: continuously curling said side of the film as the side approaches said portion of the path to form a loop at said side with the edge doubled back adjacent a more central portion of the film; affixing the film adjacent said edge to said portion of the film to define a closed loop at the side of the film; slideably engaging the inside of said closed loop and positioning said side of the film by said engagement as said film moves along said portion of the path; and releasing said engagement after said film has traversed said portion of said path.

4. The method of manipulating a side edge of a length of film as the film moves lengthwise along a given portion of a path, said method comprising the steps of: continuously curling said side of the film around a guide extending mainly in the direction of film movement as the side approaches said portion of the path to form a loop at said side surrounding said guide with the edge doubled back adjacent a more central portion of the film; affixing the film adjacent said edge to said portion of the film to define a closed loop at the side of the film; slideably moving said closed loop along the guide and positioning said side of the film by said guide as said film moves along said portion of the path; and releasing said loop from said giude after said film has traversed said portion of said path.

5. The method of manipulating a side edge of a length of film as the film moves lengthwise along a given portion of a path, said method comprising the steps of: continuously curling said side of the film as the side approaches said portion of the path to form a loop at said side with the edge doubled back adjacent a more central portion of the film; releasably affixing the film adjacent said edge to said portion of the film to define a closed loop at the side of the film; slideably engaging said closed loop and positioning said side of the film by said engagement as said film moves along said portion of the path; and stripping said film adjacent said edge from said portion of said film after said film has traversed said portion of said path.

6. Apparatus for enclosing objects of a given width and height in a length of self-clinging film of a width sufficient to be wrapped in tubular form about the width of said objects, said apparatus including; a frame; means on said frame to move the length of film along a predetermined path in a given direction; supporting means on said frame below said film and extending along said path; a pair of guides of a given depth, width and peripheral dimension extending along a portion of said path, said guides at a first point along said path being spaced from each other a first distance greater than the width of said objects and which when added to twice said peripheral dimension will be less than the width of said film, said guides extending in said direction from said first point to a second point and at least one of the guides being angled toward the other of the guides from said first to said second point with the guides being immediately adjacent each other at said second point, whereby a portion of one guide adjacent said second point is closer to the corresponding portion of the other guide than the width of the objects on the film, said portion of said guide being spaced above the supporting means a distance in excess of said given height; plate means having top and bottom faces ahead of said first point with respect to said direction of film movement, said plate means having side edges spaced apart approximately said first distance plus twice said guide width and positioned so that side portions of the film extend outwardly from the side edges of the plate means approximately equally on each side, the width of the plate means inwardly from the side edges thereof being greater than the width of the guides, the thickness of said plate means at said edges being substantially equal to the thickness of said guides, said side edges extending to and terminating at the outside edges of said guides; means to wrap said side portions of said film about said side edges of said plate means with the film over and under the top and bottom faces of the plate means, whereby as the film moves from the plate means to the guides said side portions will form a re-entrant shape about the guides with the side edges of the film closer together than the distance between the guides; means beyond said plate means in said direction to bring said side edges of the film into contact with the center portion of the film between the guides, whereby the side portions form a loop about the guides and cling to the center portion and as said film moves between said two points said side portions will move along said guides and toward each other about objects on said film; and means adjacent said second point to separate said side portions of the film from the respective guides and to bring the edges of the film into juxtaposition to form a tube about said objects.

7. Apparatus for enclosing objects of a given width in a length of self-clinging film of a width sufficient to be wrapped in tubular form about the width of said objects, said apparatus including: a frame; means on said frame to move the length of film along a predetermined path in a given direction; a pair of guides of a given depth, with and peripheral dimension extending along a portion of said path, said guides at a first point along said path being spaced from each other a first distance greater than the width of said objects and which when added to twice said peripheral dimension will be less than the width of said film, said guides extending in said direction from said first point to a second point and being angled toward the other of the guides from said first to said second point with the guides being immediately adjacent each other at said second point; plate means having top and bottom faces ahead of said first point with respect to said direction of film movement, said plate means having side edges spaced apart approximately said first distance plus twice said guide width and positioned so that side portions of the film extend outwardly from the side edges of the plate means approximately equally on each side, the width of the plate means inwardly from the side edges thereof being greater than the width of the guides, the thickness of said plate means at said edges being substantially equal to the thickness of said guides, said side edges extending to and terminating at the outside edges of said guides; means to wrap said side portions of said film about said side edges of said plate means with the film over and under the top and bottom faces of the plate means whereby as the film moves from the plate means to the guides said side portions will form re-entrant shapes about the guides with the side edges of the film closer together than the distance between the guides; means beyond said plate means in said direction to bring said side edges of the film into contact with the center portion of the film between the guides, whereby the side portions form a loop about the guides and cling to the center portion and as said film moves between said two points said side portions will move along said guides and toward each other about objects on said film; and means adjacent said second point to separate said side portions of the film from the respective guides and to bring the edges of the film into juxtaposition to form a tube about said objects.

8. Apparatus for enclosing objects of a given width and height in a length of self-clinging film of a width sufficient to be wrapped in tubular form about the width of said objects, said apparatus including: a frame; means on said frame to move the length of film along a predetermined path in a given direction; supporting means on said frame below said film and extending along said path; a pair of guides extending along a portion of said path, said guides at a first point along said path being spaced from each other a distance less than the width of said film and greater than the width of said objects, said guides extending in said direction from said first point to a second point and being angled toward each other from said first to said second point with the guides being immediately adjacent each other at said second point, whereby a portion of each guide adjacent said second point is closer to the corresponding portion of the other guide than the width of the objects on the film, said portions of said guides being spaced above the supporting means a distance in excess of said predetermined height; means adjacent said first point to wrap the side portions of the film about the guides respectively as said side portions traverse said first point in moving along said path and to bring said side portions into contact with the center portion of the film between the guides, whereby the side portions form a loop about the guides and cling to the center portion and as said film moves between said two points said side portions will move along said guides and toward each other over objects on said film; and means adjacent said second point to separate said side portions of the film from the respective guides and to bring the side portions of the film into juxtaposition to form a tube about said objects.

9. Apparatus for enclosing objects of a given width and height in a length of self-clinging film of a width sufficient to be wrapped in tubular form about the width of said objects, said apparatus including: a frame; means on said frame to move the length of film along a predetermined path in a given direction; supporting means on said frame below said film and extending along said path; a pair of guides extending along a portion of said path, said guides at a first point along said path being spaced from each other a distance less than the width of said film and greater than the width of said objects, said guides extending in said direction from said first point to a second point and at least one of the guides being angled toward the other of the guides from said first to said second point with the guides being immediately adjacent each other at said second point, whereby a portion of one guide adjacent said second point is closer to the corresponding portion of the other guide than the width of the objects on the film, said portion of said guide being spaced above the supporting means a distance in excess of said given height; means adjacent said first point to wrap the side portions of the film about the guides respectively as said side portions traverse said first point in moving along said path and to bring said side portions into contact with the center portion of the film between the guides, whereby the side portions form a loop about the guides and cling to the center portion and as said film moves between said two points said side portions will move along said guides and toward each other about objects on said film; and means adjacent said second point to separate said side portions of the film from the respective guides and to bring the side portions of the film into juxtaposition to form a tube about said objects.

10. Apparatus for enclosing objects of a given width in a length of self-clinging film of a width sufficient to be wrapped in tubular form about the width of said objects, said apparatus including: a frame; means on said frame to move the length of film along a predetermined path in a given direction; a pair of guides extending along a portion of said path, said guides at a first point along said path being spaced from each other a distance less than the width of said film and greater than the width of said objects, said guides extending in said direction from said first point to a second point and at least one of the guides being angled toward the other of the guides from said first to said second point with the guides being adjacent each other at said second point; means adjacent said first point to wrap the side portions of the film about the guides respectively as said side portions traverse said first point in moving along said path and to bring said side portions into contact with the center portion of the film between the guides, whereby the side portions form a loop about the guides and cling to the center portion and as said film moves between said two points said side portions will move along said guides and toward each other about objects on said film; and means adjacent said second point to separate said side portions of the film from the respective guides and to bring the side portions of the film into juxtaposition to form a tube about said objects.

11. A device for forming individual packages of objects of a given width using a length of a self-clinging film of a width sufficient to be wrapped in tubular form about the width of said objects, said device including: a frame; means on said frame to move the length of film along a predetermined path in a given direction; a pair of guides extending along a portion of said path, said guides at a first point along said path being spaced from each other a distance less than the width of said film and greater than the width of said objects, said guides extending in said direction from said first point to a second point and at least one of the guides being angled toward the other of the guides from said first to said second point with the guides being immediately adjacent each other at said second point; means adjacent said first point to wrap the side portions of the film about the guides respectively as said side portions traverse said first point in moving along said path and to bring said side portions into contact with the center portion of the film between the guides, whereby the side portions form a loop about the guides and cling to the center portion and as said film moves between said two points said side portions will move along said guides and toward each other about objects on said film; means adjacent said second point to separate said side portions of the film from the respective guides and to bring the side portions of the film into juxtaposition to form a tube about said objects; and means beyond said second point to bring said film together between objects in said tube to divide said tube into units with objects therein and to separate said units from the adjacent units.

12. Apparatus for enclosing objects of a given width and height in a length of self-clinging film of a width sufficient to be wrapped in tubular form about the width of said objects, said apparatus including: a frame; means on said frame to move the length of film along a predetermined path in a given direction; supporting means on said frame below said film and extending along said path; a pair of guides extending along a portion of said path, said guides at a first point along said path being spaced from each other a distance less than the width of said film and greater than the width of said objects, said guides extending in said direction from said first point to a second point and at least one of the guides being angled toward the other of the guides from said first to said second point with the guides being immediately adjacent each other at said second point, whereby a portion of one guide adjacent said second point is closer to the corresponding portion of the other guide than the width of the objects on the film, said portion of said guide being spaced above the supporting means a distance in excess of said given height; means to deposit said objects on said film ahead, with respect to said direction, of the part of said path at which said portion of one guide is closer to the corresponding portion of the other guide than the width of the objects; means adjacent said first point to wrap the side portions of the film about the guides respectively as said side portions traverse said first point in moving along said path and to bring said side portions into contact with the center portion of the film between the guides, whereby the side portions form a loop about the guides and cling to the center portion and as said film moves between said two points said side portions will move along said guides and toward each other about objects on said film; and means adjacent said second point to separate said side portions of the film from the respective guides and to bring the edges of the film into juxtaposition to form a tube about said objects.

13. Apparatus for forming a tube from a continuous length of a self-clinging film of at least a given width, said apparatus including: power means to move said film lengthwise in a given direction along a predetermined path; and means at a first point along said path to engage the side edges only of said film and to maintain said engagement as said film moves to a second point along said path spaced in said direction from said first point and to disengage said edges adjacent said second point, said means including a pair of spaced members comprising a pair of cold rolled steel rods, means for guiding the sides of the film to form a loop in each side enclosing the rod therein; at said first point in said path, said rods being spaced apart widely but somewhat less than said width, at said second point said rods being in juxtaposition whereby the sides of the film will be brought together to form a tube.

14. Apparatus for engaging and positioning a side of a length of film moving in a given direction lengthwise along a given portion of a path, said apparatus including: a guide extending the length of said portion of said path and supported beyond each end of said portion; means at the entering end of said portion of said path, with respect to said direction of movement, to loop said side about said guide with the film portion at the edge of said side in juxtaposition to a portion of said film spaced from said edge and to affix said portions of the film in juxtaposition to each other, whereby said loop will slide along said guide and said side will follow the position of the guide; and means at the departing end of said portion of said path, with respect to said direction of movement, to open said loop and release said side from said guide.

15. The method of manipulating a side edge of a length of film as the film moves lengthwise along a given portion of a path, the film having self-clinging characteristics, said method comprising the steps of: continuously curling said side of the film around a guide as the side approaches said portion of the path to form a loop at said side around the guide with the edge doubled back adjacent a more central portion of the film; releasably affixing the film adjacent said edge by its self-clinging action to said portion of the film to define a closed loop at the side of the film; moving said closed loop and positioning said side of the film by its engagement with the guide as said film moves along said portion of the path; and separating the self-clinging portions to strip said film adjacent said edge from said portion of said film after said film has traversed said portion of said path.

References Cited in the file of this patent
UNITED STATES PATENTS

| | | |
|---|---|---|
| 2,874,752 | Brey | Feb. 24, 1959 |
| 2,886,930 | Martin | May 19, 1959 |

UNITED STATES PATENT OFFICE
CERTIFICATE OF CORRECTION

Patent No. 3,024,581            March 13, 1962

Charles E. Cloud

It is hereby certified that error appears in the above numbered patent requiring correction and that the said Letters Patent should read as corrected below.

Column 9, line 16, for "with" read -- width --.

Signed and sealed this 24th day of July 1962.

(SEAL)
Attest:

ERNEST W. SWIDER            DAVID L. LADD
Attesting Officer            Commissioner of Patents